(12) United States Patent
Strathearn et al.

(10) Patent No.: US 8,073,811 B2
(45) Date of Patent: *Dec. 6, 2011

(54) ONLINE CONTENT COLLABORATION MODEL

(75) Inventors: William D. Strathearn, Fremont, CA (US); Michael David McNally, Scotts Valley, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/861,372

(22) Filed: Aug. 23, 2010

(65) Prior Publication Data

US 2010/0318922 A1    Dec. 16, 2010

Related U.S. Application Data

(63) Continuation of application No. 11/955,188, filed on Dec. 12, 2007, now Pat. No. 7,797,274.

(51) Int. Cl.
*G06F 17/30* (2006.01)
(52) U.S. Cl. .................. 707/608; 715/223; 715/229
(58) Field of Classification Search .................. 707/608, 707/609, 638, 804, 805; 715/229, 223
See application file for complete search history.

(56) References Cited

U.S. PATENT DOCUMENTS

| | | | |
|---|---|---|---|
| 7,797,274 B2 * | 9/2010 | Strathearn et al. | 707/609 |
| 2006/0004628 A1 | 1/2006 | Axe et al. | |
| 2006/0200755 A1 | 9/2006 | Melmon et al. | |
| 2007/0239684 A1 | 10/2007 | Anderson et al. | |
| 2009/0125518 A1 | 5/2009 | Bailor et al. | |
| 2009/0157490 A1 | 6/2009 | Lawyer | |
| 2009/0157667 A1 | 6/2009 | Brougher et al. | |
| 2009/0165128 A1 | 6/2009 | McNally et al. | |
| 2009/0193053 A1 | 7/2009 | Swart | |

FOREIGN PATENT DOCUMENTS

| | | |
|---|---|---|
| JP | 2004-139343 | 5/2004 |
| KR | 20040053680 | 6/2004 |
| WO | WO 03/102776 | 12/2003 |

OTHER PUBLICATIONS

Arrington, Michael, "Companies I'd Like to Profile (But Don't Exist)" [online] Nov. 21, 2005 <URL:http://www.techcrunch.com/2005/11/21/companies-id-like-to-profile-but-dont-exist/> [retrieved Mar. 9, 2009], 24 pages.

(Continued)

*Primary Examiner* — Cheryl Lewis
(74) *Attorney, Agent, or Firm* — Fish & Richardson P.C.

(57) ABSTRACT

A collaborative editing model for online content is described. A set of suggested edits to a version of the online content is received from multiple users. Each suggested edit in the set relates to the same version. The set of suggested edits is provided to an authorized editor, who is visually notified of differences between the version of the content and the suggested edits and conflicts existing between two or more suggested edits. Input is received from the editor resolving conflicts and accepting or rejecting suggested edits in the set. The first version of the content is modified accordingly to generate a second version of the content. Suggested edits from the set that were not accepted nor rejected and are not in conflict with the second version are carried over and can remain pending with respect to the second version.

33 Claims, 7 Drawing Sheets

OTHER PUBLICATIONS

"Badges" Amazon.com Help Topics, Amazon.com, Inc.[online] Jan. 6, 2007 <URL: http://web.archive.org/web/20070106061315/www.amazon.com/gp/help/customer/di.... [retrieved Mar. 22, 2009], 8 pages.

"Bitkeeper" Wikipedia, the Free Encyclopedia [online] Oct. 3, 2007 <URL: http://en.wikipedia.org/wiki/BitKeeper> [retrieved Mar. 22, 2009], 3 pages.

"Case Study: Major Card Issuer Prevents Identity Fraud and Streamlines Operations With ID Score Risk" Equifax, Inc. May 2007, 2 pages.

Consumer Information Sheet for eIDverifier, Equifax, Inc. [online] 2006 <URL: http://www.equifax.com/cs7/BlobServer?blobcol=urldata&blobheadername1=content-type&blobheadername2=Content-Disposition&blobheadername3=MDT-Type&blobheadervalue1=application%2Fpdf&blobheadervalue2=inline%3B+filename%3DEFS-594-ADV-eIDVerifier.pdf&blobheadervalue3=abinary%3B+charset+UTF-8&blobkey=id&blobtable=MungoBlobs&blobwhere=1188333172550&ssbinary=true> [retrieved Jun. 28, 2008], 2 pages.

"Git" Wikipedia, the Free Encyclopedia [online] Oct. 5, 2007 <URL: http://en.wikipedia.org/wiki/Git_%28software%29> [retrieved Mar. 22, 2009], 11 pages.

"Identify Manager Verification Technical Details" TransUnion LLC. [online] Sep. 30, 2007 <URL: http://www.transunion.com/docs/techservices/IdMgr_Technical_Details.pdf> [retrieved Sep. 28, 2007], 4 pages.

"Your Real Name Attribution" Amazon.com Help Topics, Amazon.com, Inc. [online] Jan. 19, 2007 <URL not available> [retrieved Mar. 21, 2009], 8 pages.

Whitin, Dave et al., "Predictive Modeling for True Name Fraud" An Equifax Predictive Sciences Research Paper, Equifax, Inc. Sep. 2006, 9 pages.

"Wikipedia: About" Wikipedia, the Free Encyclopedia. [online] Nov. 11, 2007 <URL: http://en.wikipedia.org/wiki/Wikipedia:About> [retrieved Mar. 22, 2009], 12 pages.

International Search Report and Written Opinion for PCT Application No. PCT/US2008/086480, mailed Jul. 27, 2009.

* cited by examiner

ONLINE CONTENT COLLABORATION MODEL

CROSS-REFERENCE

This application is a continuation application of U.S. patent application Ser. No. 11/955,188, U.S. Pat. No. 7,797,274, entitled "Online Content Collaboration Model", filed Dec. 12, 2007, by W. Strathearn, et al., which is incorporated by reference herein in its entirety.

TECHNICAL FIELD

This invention relates to editing online content.

BACKGROUND

Increasingly the general population is turning to the Internet to quickly find information on a wide range of topics. Some web sites provide content for free, although are of questionable reliability. Other web sites have credibility to provide authoritative information, but may require a fee to access the information. Typically online content can only be edited by the publisher of the online content. For example, the latter web sites referred to above generally cannot be freely edited. However, some web sites provide an open editing model, where anyone with access to the content may add content or edit existing content. If there are no restrictions on who may add or edit content, the credibility and quality of the content may be diminished. The website www.wikipedia.org is an example of a somewhat open editing model. Content included in www.wikipedia.org can be written and edited in a simple markup language using a web browser by any Internet user.

SUMMARY

In general, in one aspect, the invention features processes, computer program products and systems for editing online content. In general, in one aspect, the invention features methods, systems and computer program products for providing a collaborative editing model for online content. User-created online content is received, being a first public-facing version of the content. A set of suggested edits to the online content is received from multiple users. Each suggested edit in the set relates to the first public-facing version. The set of suggested edits is provided to an authorized editor of the online content. The editor is visually notified of differences between the first public-facing version of the content and the suggested edits and is notified of conflicts existing between two or more suggested edits. A conflict exists if a first suggested edit cannot co-exist with a second suggested edit. Input is received from the editor resolving conflicts and accepting or rejecting suggested edits in the set. The first public-facing version of the content is modified based on the set of suggested edits and the input from the editor to generate a second public-facing version of the content. Suggested edits from the set that were not accepted nor rejected and are not in conflict with the second public-facing version of the content are carried over for future editor input accepting or rejecting the carried over suggested edits in relation to the second public-facing version of the content.

In general, in another aspect, the invention features a system providing a collaborative editing model for online content. The system includes a data store, a suggested edits module and an editing module. The data store is configured to store user-created online content. The suggested edits module is configured to receive a set of suggested edits to the online content. The set of suggested edits is provided by multiple users and each suggested edit relates to a first public-facing version of the online content. The editing module is configured to provide the set of suggested edits to an authorized editor of the online content. The editing module is further configured to visually notify the editor differences between the first public-facing version of the content and the set of suggested edits and of conflicts existing between two or more suggested edits. The editing module can receive input from the editor resolving conflicts and accepting or rejecting suggested edits in the set. Further, the editing module can modify a first public-facing version of the online content based on the suggested edits and the input from the editor to generate a second public-facing version. The editing module carries over suggested edits from the set that were not accepted nor rejected and are not in conflict with the second public-facing version of the content for future editor input accepting or rejecting the carried over suggested edits in relation to the second public-facing version of the content.

Implementations of the inventions can include none, some of all of the following features. Additional input can be received from the editor, the input being additional edits to the online content. The second public-facing version of the content can be further based on the additional edits. The authorized editor can be the author of the user-created online content or can be a collaborator designated by the author. A search query can be received for online content satisfying criteria specified by the search query, and it can be determined that the user-created online content satisfies the criteria. The user-created online content can be provided in response to the search query. If input is received from the editor to hold a suggested edit, the suggested edit can remain pending with respect to the second public-facing version of the online content. A conflict can be detected between a first suggested edit and a second suggested edit and the editor can be notified of the conflict. Additional input can be received from the editor providing a resolution to the conflict.

Providing the suggested edits to the editor can include providing a marked-up version of the online content showing the suggested edits relative to the first public-facing version of the online content. Providing a marked-up view of the online content can include showing differences between the first public-facing version of the online content and a previous public-facing version of the online content. Comments can be received appended to one or more of the suggested edits and the comments provided to the editor. A reply can be recorded from the editor to at least one of the comments. An entry to a discussion thread can be received associated with the online content.

The invention can realize none or some of the following advantages. The collaborative editing modeling described allows for input to online content to come from a wide range of sources, while providing editing control to a smaller, defined group of authors and collaborators. Keeping editing control in the hands of a defined group of one or more persons provides some assurance as to the quality, consistency and credibility of the online content.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
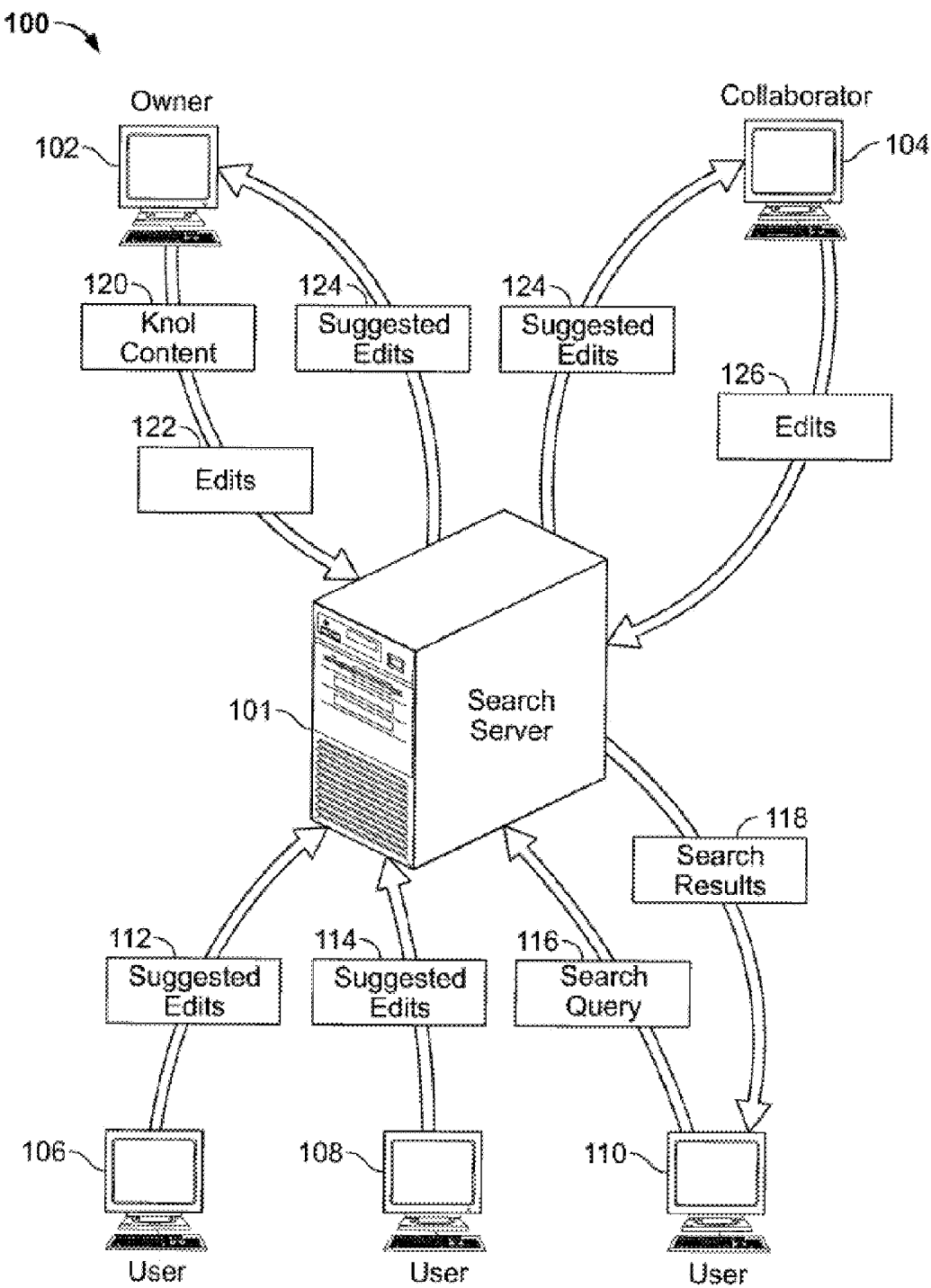
FIG. 1 is a schematic representation of an example system providing a collaborative editing model for online content.

Techniques, methods, apparatus and a system for editing online content are described. In particular, a collaboration model for editing an online content item shall be described. In one illustrative example, the online content item is a user-created webpage that attempts to be the "best answer" for a query provided to an online search engine. Such an online content item is referred to herein as a "knol", although other nomenclature can be used. The knol can include text, pictures, video, maps, and/or embedded applications. The knol can be owned by an author of the knol. However, other users can be authorized to edit the knol, i.e., collaborators, or to suggest edits, as is described further below. Although the description below is in relation to knols for illustrative purposes, it should be understood that the techniques, apparatus and systems described can be used to collaborate in relation to any text-based online content item.

A knol can be created by an author voluntarily of his or her own initiative, or can be created in response to an invitation to create a knol on a particular topic. For example, a search engine such as the Google search engine available at www.google.com by Google, Inc. of Mountain View, Calif., may display an invitation to a Google user to create a knol that can provide an answer to a query frequently received by the search engine. In one implementation the invention can be triggered when a user inputs a search query into the search engine and the search query has been identified by the search engine as a common query for which a knol is desired. Other trigger events can exist, and the one discussed is an illustrative example.

In one implementation, an author creates a knol using a knol user interface that is hosted by a search engine provider, for example, Google, Inc. Creating the knol through the knol user interface can provide consistency in the manner in which the knol is created. Additionally, the knol can be identified as being a "knol" when presented with other search results in response to a search query received by the search engine. For example, in one implementation, a search result that is a knol has a distinctive appearance in a search result set, and may either be mingled with other search results or identified separately, e.g., in a separate box or otherwise identified as "knol" results.

The knol user interface can provide a page viewer. A knol can appear inside a frame that shows the knol content, the author, contributors (i.e., non-author users that contributed content to the knol) and search and navigation tools can be provided to facilitate use of the knol.

A collaborative editing model can be provided wherein the owner of a knol (i.e., the author), author-designated collaborators and others can contribute edits to the contents of the knol. A knol has a public-facing version, which is a current version that is publicly available for viewing. The owner of the knol is authorized to apply edits to the knol content that effect a change to the public-facing version of the knol. The owner can designate one or more collaborators with permission to also apply edits to the knol content that change the public-facing version of the knol. Other than the owner and the collaborators, no one else can change the public-facing version of the knol. However, others can provide suggested edits to the current public-facing version of the knol. The owner and the collaborators can then decide whether or not to accept or reject suggested edits, as is described further below.

In one implementation, any person who can publicly view the knol content can provide a suggested edit. In another implementation, an entity hosting the knols, for example, Google as described above, can restrict suggested edits to persons that have registered with Google, thereby authenticating, at least to some degree, that the suggested edits are being made by a human being, rather than an automated spider or the like.

The collaborative editing model provides flexible editing capabilities to any authorized editor, e.g., the owner 102 or a collaborator 104. A set of suggested edits accumulates with respect to a first public-facing version of the online content. That is, each suggested edit in the set is an edit to the same base version of the content; the edits are in parallel with one another. After a set of suggested edits provided by multiple different users has accumulated, an authorized editor can review the set of suggested edits and has the flexibility to pick and choose which edits to apply to generate a modified second public-facing version of the online content, subject to conflicts between edits. By contrast, if the edits are provided in series, meaning that each suggested edit accumulated relates to the base version+the last received suggested edit, then each suggested edit builds on and is therefore dependent on a previous suggested edit. If such a scenario, if the authorized editor decides to reject a suggested edit, then he/she cannot accepts any downstream suggested edits either, as they were built on the rejected edit. Editing flexibility is thereby curbed. In the system described herein, because the suggested edits all relate to the same base version, the suggested editor is not restricted in what he/she may or may not accept by an earlier decision to reject a particular suggested edit. The authorized editor is provided with a visual notification of the suggested edits as compared to the first public-facing version of the content (i.e., the base version) and is notified of conflicts between two or more suggested edits. Conflict notification and resolution is described further below.

Referring to FIG. 1, a schematic representation of an example system 100 providing a collaborative editing model for online content is shown. An owner 102 can provide knol content 120 to a search server 101. Users of the search server, for example, users 106 and 108, can provide their suggested edits 112 and 114 respectively of the knol content 120 to the search server. The suggested edits 112 and 114 can be accessed by the owner 102 and one or more collaborators, e.g., collaborator 104. The owner 102 and collaborator 104 can provide edits 122 and 126 respectively to the search server 101, thereby modifying the public-facing version of the knol content. A user 110 who enters a search query 116 into the search server can receive a set of search results 118 that may include the knol content 120, depending on the search terms. In other example systems the search server 101 can be replaced by two or more servers, each providing a sub-set of the functionality referred to above.

In the example system shown, only the owner 102 can provide knol content 120. However, in other implementations, the owner 102 can permit others, e.g., the collaborators 104, to provide content as well. The owner 102 can have certain authority that other authors or collaborators are not given, for example, the authority to change ownership, invite/ disallow collaborators, publish or unpublish the knol content, permit or deny advertising in conjunction with the knol content, specify the recipients of advertising revenue if advertising is permitted, and/or change the terms of a license of use of the knol content to name a few examples.

An edit includes one or more modifications to the content of a knol and can include a brief explanation of why the modification was made, or other comments about changes to the knol. If a user has authorization to modify the knol, i.e., is an owner or collaborator, then the user's changes to the knol can take effect to the public-facing version immediately. Otherwise, if the user does not have authorization, then the user's edits can be retained as a "delta". The delta can be placed in a suggested edits module where an owner or collaborator of the knol can review the delta and decide to merge or discard the suggestion. An edit suggestion (i.e., an unmerged delta) does not modify a public facing version of the knol. In other implementations, any user can edit the public-facing version of the knol content, and can access suggested edits received from other users.

In one implementation, knol content can be edited using an in-line HTML editor. The functions of the editor include: text editing functions; a display of visual differences (mark-ups) between two versions of a section; and a display of suggested edits.

Figure 2:
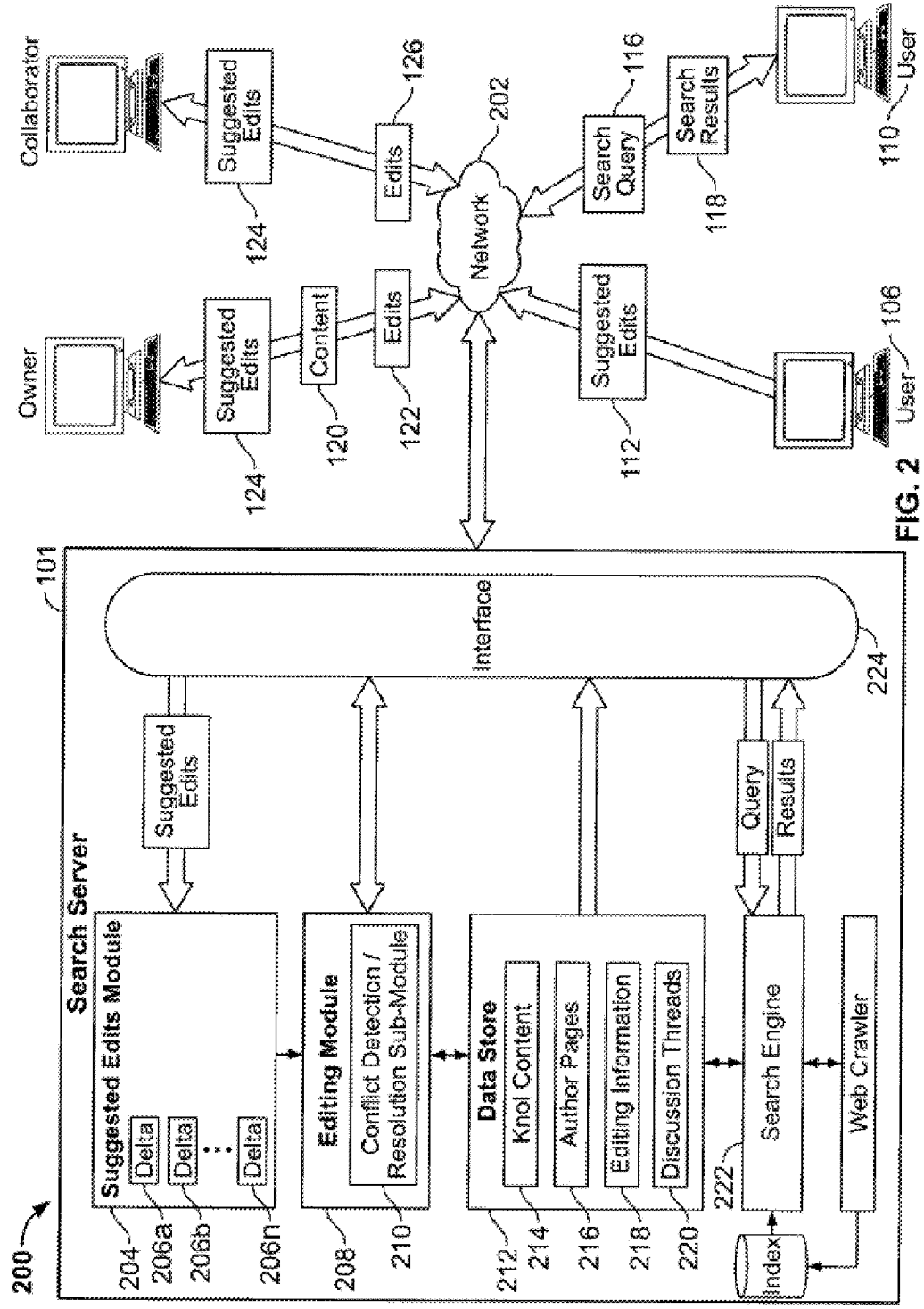
FIG. 2 is a schematic representation of an example search server providing a collaborative editing model for online content.

Referring to FIG. 2, a schematic representation of the example search server 101 of FIG. 1 is shown in further detail. The search server 101 is shown to communicate with the owner 102, collaborator 104 and users 106 and 110 over a network 202. The network 202 can be the Internet, a wide-area network, local-area network, or any other network providing for electronic communication between the parties.

The example search server 101 includes an interface 224 for communication with the parties over the network 202. The user interface functionality available to one party, e.g., the owner 102, may be different than the functionality provide to another party, e.g., the users 106 and 110, as is described further below. A suggested edits module 204 is provided to store suggested edits provided by user, e.g., user 106. A pending suggested edit is referred to as a "delta", and the suggested edits module 204 includes deltas 206a-n. An editing module 208 provides editing functionality to the owner 102 and any collaborators, e.g., collaborator 104. A conflict detection/resolution sub-module 210 is provided to detect conflicts between two or more deltas and to resolve the conflict, as is described further below.

A data store 212 includes knol content 214 and editing information 218. The editing information 218 can include revisions to the knol content, comments appended to revisions, edit logs and the like. In some implementations, discussion threads 220 can be appended to knol content and included within the data store 212, as is discussed further below. Author pages 216 included in the data store 212 provide information about authors of the knol content, and are described in further detail below.

A search engine 222 receives and responds to search queries, for example, the search query 116 of the user 110. Search results are provided, for example, search results 118 in response to search query 116. If a knol exists in the data store 212 that corresponds to the search query, the knol can be provided within the search results 118.

In other implementations, the functionality provided by the search server 101 described above can be distributed across two or more servers in electrical communication with the network 202, either directly or indirectly. Other configurations of search servers 101 and the components thereof can be used, and the search server 101 of FIG. 2 is but one example.

Figure 3:
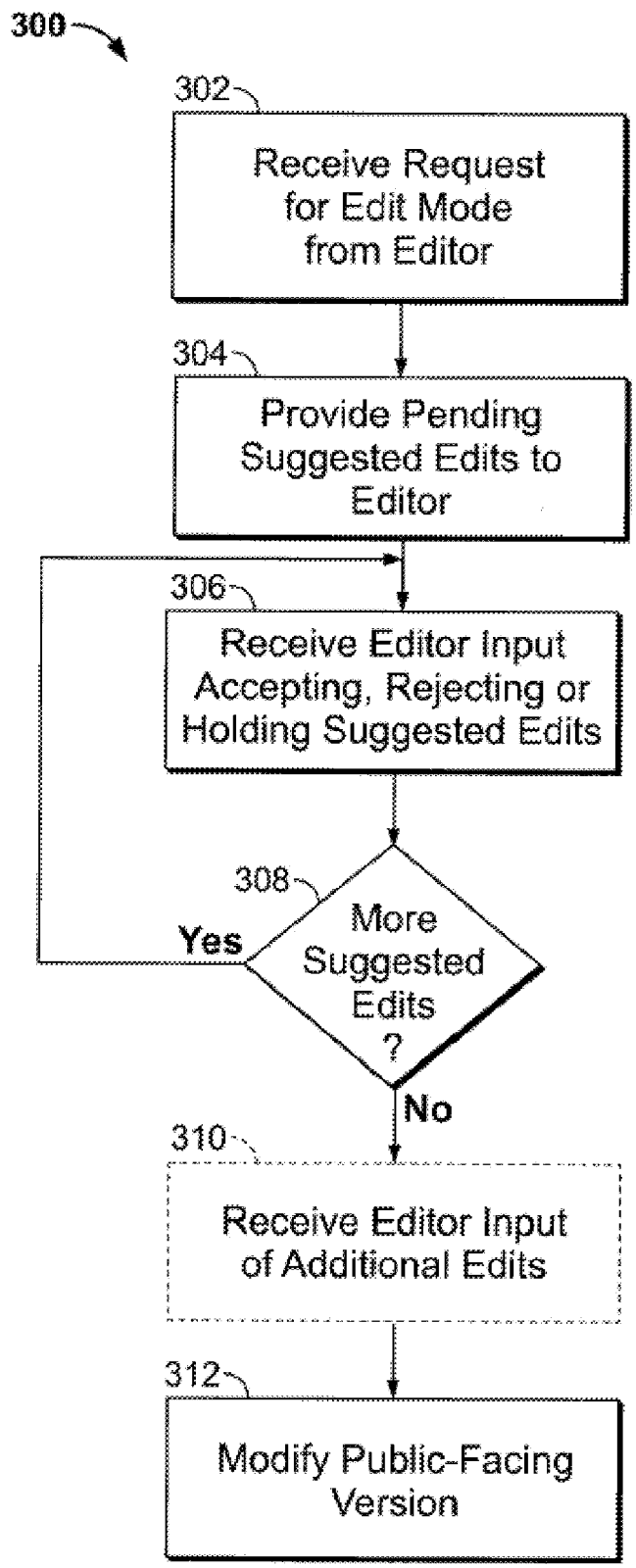
FIG. 3 is a flowchart showing an example process for collaboratively editing online content.

Referring now to FIG. 3, an example process 300 for an owner or collaborator of a knol to review suggested edits and modify the contents of a knol is shown. The owner or collaborator enters into an edit mode with respect to the knol (Step 302). For example, a knol user interface can be provided to view the knol, and an "edit knol" control can be selected by the owner or collaborator. The owner or collaborator can then be requested to enter a user name and password, or otherwise identify themselves, such that they can enter the edit mode with the appropriate access entitled to them on account of their status as an owner or collaborator.

The owner or collaborator is provided with all suggested edits that are currently pending with respect to the current public-facing version of the knol (Step 304). That is, any suggested edits that were input by others since the owner or any collaborator last entered the edit mode and changed the public-facing version of the knol are presented, as well as any suggested edits that were carried over from a previous version, which shall be discussed further below.

The owner or collaborator can view the suggested edits, for example, in the order in which they were received. For each suggested edit, the owner or collaborator can select to accept the suggested edit, reject the suggested edit or hold the suggested edit (i.e., neither accept nor reject) (Step 306). The suggested edits can be presented to the owner or collaborator in a mark-up mode, for example, showing deletions as strike-outs and additions in bold, underlined and/or in a contrasting color. The mark-up shows the differences between the suggested edits and the current public-facing version of the knol.

Once there are no further suggested edits to review ("No" branch of decision step 308), the owner or collaborator optionally can input additional edits of their own (Step 310) or can end the editing process. Upon ending the editing process, the public-facing version of the knol is modified (Step 312).

If the owner or collaborator chose to hold one or more suggested edits, then the held suggested edits are carried over to the next version of the knol. That is, if the current public-facing version of the knol before the editing session is "Version 1", and the public-facing version of the knol after the editing session is "Version 2", then the held suggested edits are now pending with respect to Version 2 of the knol. The owner or a collaborator can then, perhaps at a later time, make a decision whether to apply the carried over suggested edits to Version 2 or to reject them altogether.

In one implementation, each suggested edit can be applied like a layer on top of the public version. Visual highlights or strike-out mark-ups can indicate sections of the text that have been removed or added. The mark-up can be color-coded to an author that made the suggestion.

In one implementation, a conflict resolution feature is provided such that an owner or collaborator can resolve conflicts as between two different suggested edits. For example, the conflict detection/resolution sub-module 210 can provide the conflict resolution feature. A first delta (i.e., unaccepted suggested edit) may include an edit deleting a sentence. A second delta may include an edit to change the wording of the sentence, but not delete the sentence. The two deltas are therefore in conflict at least with respect to this particular sentence; the owner or collaborator can only accept either the first or second delta, but not both.

The conflicting content can be presented in a distinctive manner to indicate the conflict. The owner or collaborator can be required to resolve the conflict before continuing to edit the knol. In this particular example, the conflict can be resolved by: (1) rejecting both deltas; (2) accepting the first delta and rejecting the second delta; or (3) rejecting the first delta and accepting the second delta. If the conflict as between the first and second deltas is limited to only a portion of the one or both of the two deltas, i.e., one or both deltas included other suggested edits that were not in conflict with each other, the conflict resolution can be limited to just the conflicting portion of the deltas. That is, if the second approach above is taken, the second delta can be rejected only insofar as the conflict, and the suggested edits in the balance of the second delta can be accepted or rejected by the owner or collaborator, as they see fit.

A conflict detection mechanism (e.g., conflict detection/resolution sub-module 210) can be employed to detect conflicts between suggested edits. In one implementation, the conflict detection mechanism uses a modified version of a three-way merge algorithm. A typical three-way merge algorithm looks for overlapping edits to content and assumes that if there is overlap there is a conflict. Even if the overlap region is only a relatively small portion of the overall two edits, the entire two edits are flagged as being in conflict. By contrast, the modified three-way merge algorithm applied here can reduce the region identified as the conflict region to the actual content in conflict. Further, there can be an examination of the conflict region to determine whether an actual (rather than assumed) conflict exists. That is, it is possible that two overlapping edits make the same edit to a word to correct for a spelling error. In that case, there is in fact no conflict, as both edits can be accepted.

An optional comment can be appended at the time of rejection or approval of a suggested edit. In additional, any comment appended to a suggested edit can be replied to by the owner or collaborator. An edit can remain in an edit log and be marked as accepted or discarded. In one example the edit log is included in the editing information 218 in the data store 212. All edits that contributed to the current public facing version of the section can be listed. In the case that the edit was the result of accepting suggested edits, those suggested edits can be listed as "children" of the authoritative edit (i.e., the edit of the owner or collaborator). At each editing step, an "undo" operation can be supported, such that any previous version can be reverted to.

In one implementation, when someone other than an owner or collaborator enters an edit mode to make a suggested edit to the knol content, that person is not privy to other suggested edits already within the "suggested edits module", and/or comments attached to earlier or pending suggested edits. That is, the person can only input their suggested edit without viewing editing history, pending edits, etc. In another implementation, such a person can view the pending edits in the suggested edits module at the time of inputting their own suggested edit. However, their edit will be relative to the current public-facing version of the knol, not relative to any pending suggested edits in the suggested edits module. In other implementations, only certain persons that are neither an owner nor a collaborator are authorized to view other edits and/or an edit log, history or edits, etc., and would have to authenticate their identity before being granted access to the other edits.

In one implementation, a person editing a knol can compare any two versions of the knol content, or a section thereof, and see the additions and deletions that were performed in order to bring the older version toward the newer version. These additions and deletions can be represented with mark-up that is similar to the suggested edit mark-up. In some implementations, another view can allow the entire knol to be highlighted in colors corresponding to the ownership of each word in the document, where ownership can be defined as the person who added a particular word into the document.

In some implementations, discussion threads can be attached to a knol (see 220, FIG. 2). The threads can be searchable, filterable (by date, author, etc.) and generally viewed in reverse chronological ordering of the last time the discussion thread was created or any reply was made. In some implementations, comments and edits to a knol are searchable by explicitly searching knol comments, but they do not themselves come up as web search results.

The knol user interface can provide a page editor. In an edit mode, the author and authorized users (e.g., collaborators) can modify page-level properties and rearrange components within the knol. For example, subject to permission limits, the page editor can be used to edit meta information about a knol. Examples of meta information that can be modified using the page editor include: page name, authors list, bool indicating allowed contributions, permissions, creative-commons level and revenue sharing strategy. In one implementation, the meta information can be modified inline or in a separate page. The meta information can be displayed as simple key/value pairs in a form.

In one implementation, in addition to meta information, other information about the knol's table of contents or section arrangement and configuration can be edited. By editing the table of contents, the underlying sections can be adjusted accordingly. For example, a new section can be inserted at a selected position in the table of contents, a section can be deleted from the table of contents or a section can be moved (e.g., dragged and dropped) within the table of contents.

In one implementation, a paste operation can be used to create a knol. For example, text or other content can be pasted from a clipboard as a transclusion (live feed), as a template (inherit the template of the original) and/or by copying the content.

The knol user interface can provide a history of the knol. That is, the knol's revision history can be viewed, including, information about who made each revision and how much they changed. The differences between two versions of the knol can be viewed, showing the changes ("diff") made as between the two particular versions. The history can be used to rollback to a particular version of the knol. In some implementations, only the owner and collaborators can view the history of the knol. In other implementations, persons other than the owner and collaborators can view history, either all other persons or else certain persons either identified by name or meeting a certain criteria.

In one implementation, the knol user interface is implemented using a mixture of Jotscript, client, server and translucent javascript and XML plug-in components. Jotscript and the server-side jot library can give access to features such as page and data transclusion, inheritance, search, templates (applying "styles") and forms (applying particular views and interaction-affordances upon a page). Pages can be stored natively in XML with XHTML in the "main/text" property of a node. A node is a container of properties.

There can be three categories of pages: knol pages, author pages and admin pages. A knol page can include all of the properties constituting a knol including edit nodes (i.e., suggested edits to a knol page) and discussion nodes (i.e., pieces of dialog about a page). An author page can include all of the properties describing an author (i.e., an authorized user), and tool and administration pages for authors. The author's tools can be anchored off a knol page, which itself describes the author. Admin pages can include tools for trusted administrators. Each page type can have a set of forms, where a form behaves as a filter selecting subsets of the page for display and providing affordances for manipulating parts of the data. In some implementations, authors and authorized users are not permitted to write javascript or server-side javascript. Rather, they are restricted to particular data formats and plug-ins.

As mentioned above, a node is a container of properties. Objects can be stored in nodes. The following is a description of some objects that can be stored in nodes to implement the knol user interface. A knol can be a node of user-created content visible as a web-page or as a transclusion. A knol can have other knols transcluded as sections within the knol. Knol metadata can be a node associated in a one-to-one relationship with a knol and includes metadata about that knol. For example, related knols, discussions, edits and authors can be included in knol metadata. A write to a knol increments the knol's user-visible version number, but a write to a knol metadata does not.

An author can be an abstract class that can own and create knols. An author is represented as a node including author-specific properties (e.g., permissions, preferences, etc.). An author can be associated in a one-to-one relationship with an author-knol, where an author-knol is an autobiographical knol used as a home-page for that author. A group can refer to an author that aggregates other authors.

A message is a node including text that is written by another author and then sent to another object where others can find and transact with it. A discussion is a note posted as a reply to a knol or to another discussion item. An edit is an attempt to modify the content of a knol. An edit-response is sent by an author in response to an edit, e.g., accept, reject, discuss, etc. An offer is an attempt to grant ownership or permissions to an author. An offer-response is an author accepting or declining the given offer. A request-review object can be an author soliciting a peer review. A request-review-response object can be an author accepting or declining a peer review. If accepted, the review can be done as a discussion or knol object.

The nodes discussed above can have none, some or all of the following common properties. A path property can be a path to a page. A name property can be a page's name. A revision property can be a page's revision. An i.d. property can be a page's i.d. A user property can be a user. A time property (or editTime property) can show when the page was edited. A createTime property can show when the page was created. A createUser property can show who created the page. A main/text property can be xhtml content of the page/message.

A knol can have a unique URL, e.g., {site}/{title}/{author_url} where site is a website (e.g., knol.google.com), the title is the knol's title and the author_url can include an author name and/or disambiguation number. Past versions of a named document can be retrieved by appending a revision CGI argument, e.g., "?revision=42". A URL including a revision number can be usable as a permanent historical link. Changing the title of a knol can imply renaming it and changing its URL. If an author's name changes, or if a page is transferred from one author to another, that can result in renaming all of the author's page URLs. If a nodeID is specified, e.g., "?nodeID=4747", the nodeID can be persistent across renaming operations. In one implementation, a hit against the {site} can be resolved into a search for {query}/{author}, where the query and author can be soft/incomplete matches. Internally, knols can refer to each other using the nodeID field. In other implementations, the knol can have a permanent URL that can be a machine readable sequence of pseudo-random alphanumeric letters permanently associated with the knol irrespective of any later changes to the knol's title or ownership.

The main/text property of a knol supplies the knol's content. The content may in turn include transcluded knols, which may or may not have their own, different authors. Consider the following illustrative example. A Mrs. P is the Dean of Astronomy, Astrology and Cosmology at a certain school. She wishes to author a knol on Dark Matter. Mrs. P creates the knol and then creates three knols transcluded as sections, calling them Chapter A, Chapter B and Chapter C. Mrs. P adds Mr. K as co-author of Chapter A, Mr. G as co-author of Chapter B and Mr. R as co-author of Chapter C. The co-authors in turn delegate the actual text writing to graduate students. Mrs. P is well on the way toward producing the knol in her name on the subject of Dark Matter.

For a given knol, it can be desired to know whether the knol is "top-level" (i.e., independently searchable) or just "content" (i.e., it will not come up in a search as an entity in its own right, but it can be indexed as content of a parent page). A "content" knol can be abandoned by a parent, i.e., no longer referenced by a parent page. In some implementations, an abandoned knol is no longer visible as public-facing online content and is not findable in a web search, but may be findable by reviewing past versions of a document.

Figure 4A:
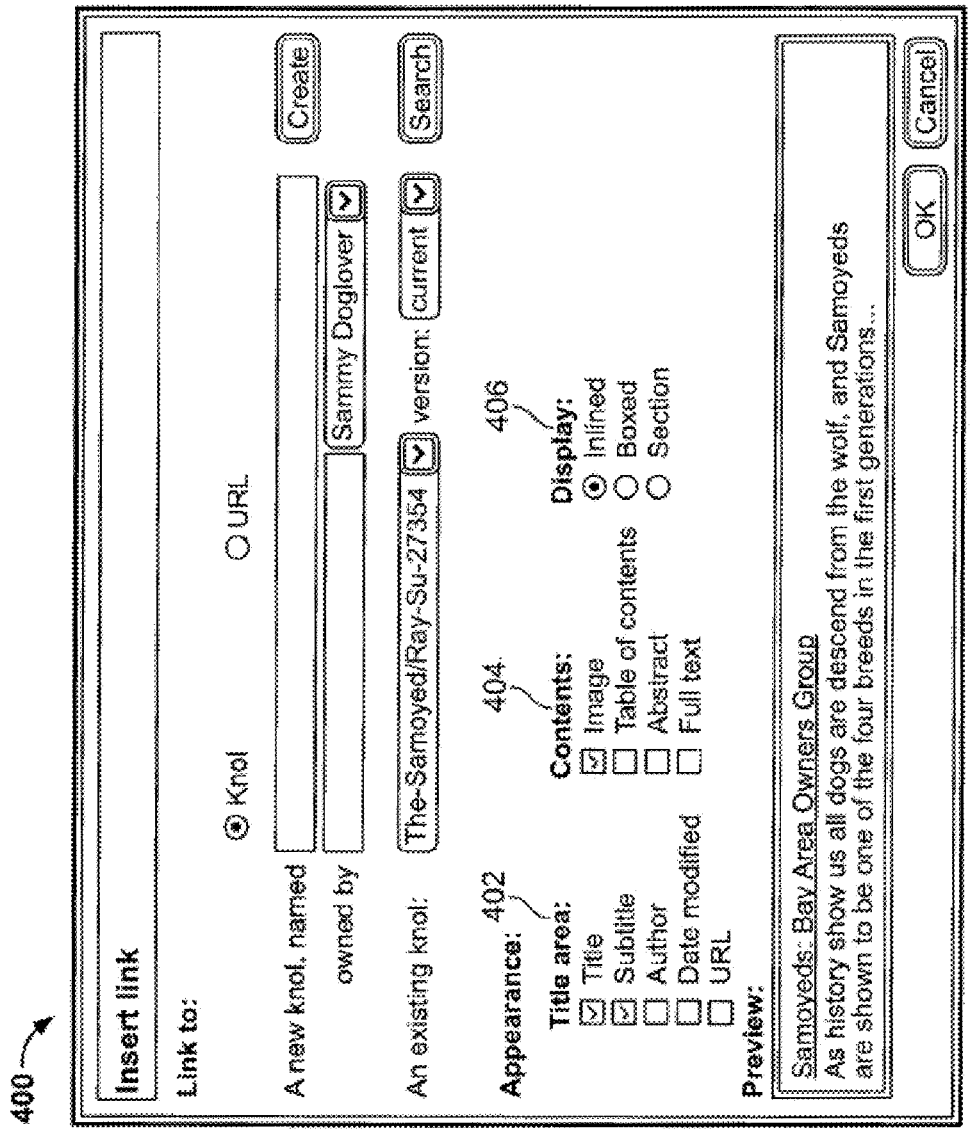
FIGS. 4A-C show example user interface screen shots for linking two or more user-created online documents.
Figure 4B:
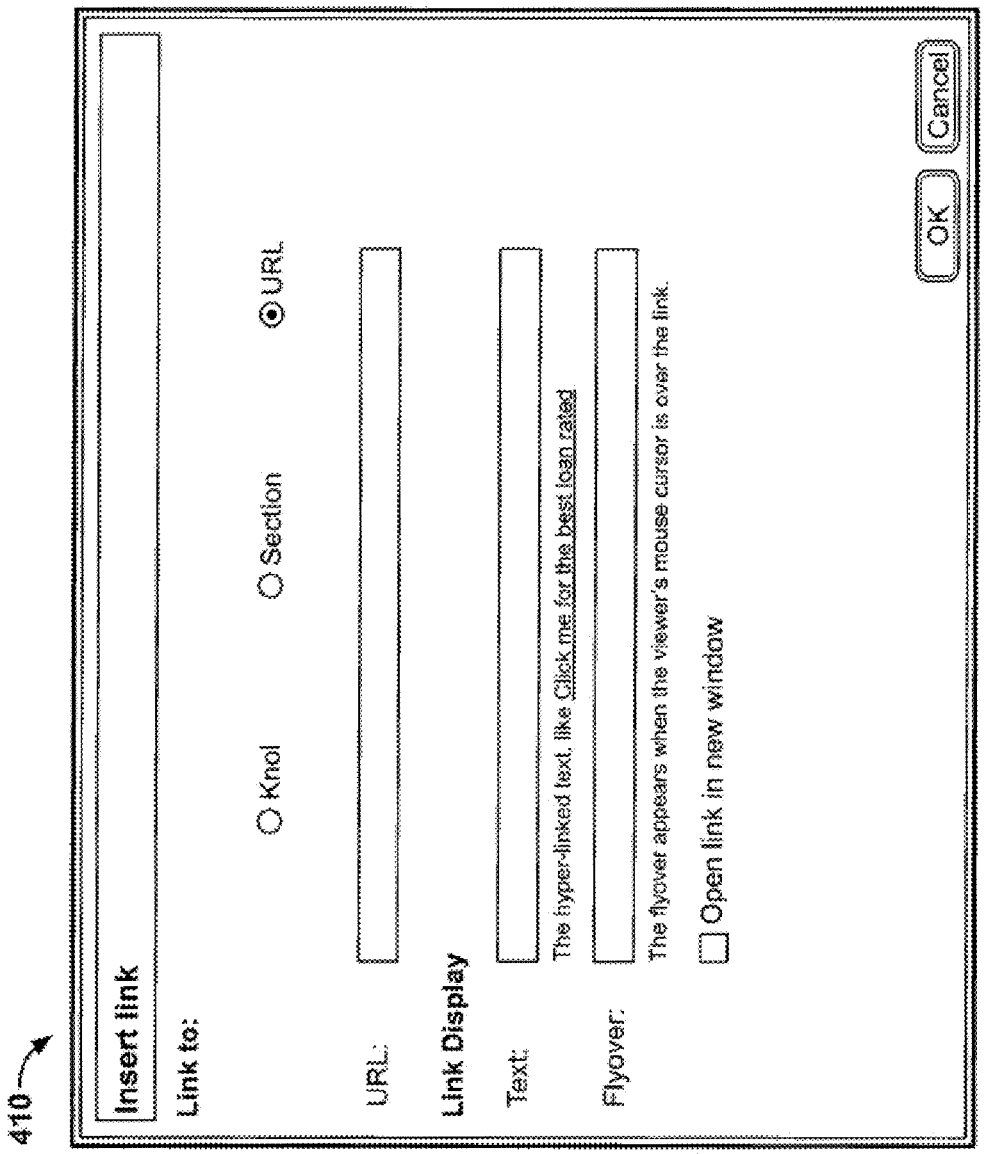

Referring to FIG. 4A, an example graphical user interface 400 is shown whereby an author of a first knol can link the first knol to a second, existing knol, either by naming the second knol or naming a URL to access the second knol (see user interface 410 in FIG. 4B). In the example shown, a new knol is being linked to an existing knol entitled "The-Samoyed/Ray-Su-27354". The properties listed in the title area 402, i.e., title, subtitle, author and date modified, can become a hyperlink to the second knol. The URL can be a web address to access the second knol. The contents properties 404 include the following. The image property can be the first image included within the second knol. The table of contents can be algorithmically generated by traversing the second knol's contents. The abstract can be a snippet composed of the first few lines of the knol, following the title and subtitle. The full text can refer to including the entire second knol other than those knols that the second knol recursively includes, which can instead be coerced into the table of contents. The display properties 406 include distinct appearance options. The inline appearance can be possible if the title area content is transcluded. The boxed appearance can take the transcluded content and wrap it into a standardized frame with text flow around it, e.g., magazine style. The section appearance can treat the transcluded knol as a section within the parent knol.

Figure 4C:
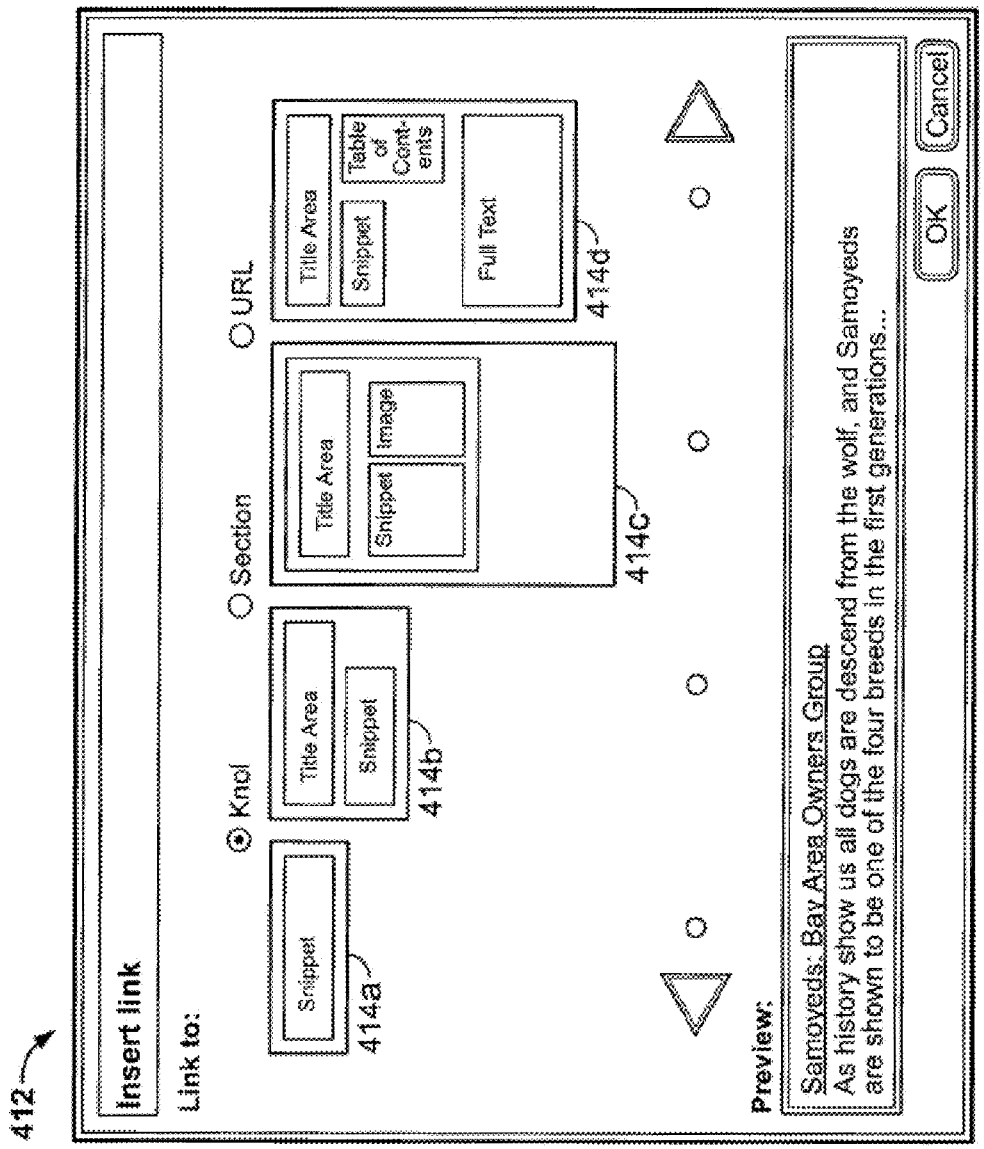

Referring to FIG. 4C, an example graphical user interface 412 is shown where an author of the first knol can select a transclusion appearance for the second knol to be transcluded in the first knol. Example appearances 414a-d are shown.

Table 1 below shows some example knol page properties, including the property names, types, values and a description of each.

TABLE 1

Knol Page Properties

| Property | Type | Value | Description |
| --- | --- | --- | --- |
| Title | String | | Title of the page which can relate to the query that the knol is primarily competing for (i.e., to be provided as the "best answer"). |
| Subtitle | String | | An optional subtitle for the page which can be used for disambiguation. |
| Role | String | Standard | Indicates this is a standard content page, i.e., an ordinary knol. |
| Role | String | Template | Indicates this page is to be used and found as a template and not as a top-level knol. |
| Role | String | Author | Indicates this page is an author's "home page". |
| Role | String | Group | Indicates this page is a group's "home page". |
| Categories | StringList | | A list of terms to which this belongs; these terms may or may not be linked to other knols. |
| Authors | StringList | | List of owner/admins. |
| AuthorsPending | StringList | | Transfers of ownership; need to be confirmed by the recipient. |
| AuthorsVisible | Number | | The first n authors are shown on the page. |
| Contributors | StringList | | A list of non-owners who have rights to edit the knol. |
| ContributorsPending | StringList | | An offer to pen a document to a contributor that needs to be confirmed by the recipient. |
| ContributorsVisible | Number | | The first n contributors can be shown on the page. |
| RedirectTo | String | | If this page is discontinued, then non-owners who browse to it can get forwarded to a new page. |
| Contribution/contributors | String | | A list of those persons who have provided textual input to the knol; generally overlaps with the authors. |
| Contribution/location | String | | If text included in the knol came from another resource, e.g., copied from a book or other website, the source can be identified and attributed. |
| Contribution/tokens | Number | | For each contributor or original source, this is the number of tokens contributed by the author. |
| bannedReasons | StringList | | If non-empty, this knol is banned from display. For example, affiliate links, ads, buy buttons, spam, or spam may be reasons for a ban. The author can view and edit the knol, but the public cannot view the knol. |
| Sections | StringList | | A list of the nodeIDs of the sections. |
| publishedVersion | Integer | | Identifies the version visible to the public. |

The knol user interface can provide an author page including content about the author. Examples of content that can be included in an author page are: a picture of the author; author's name; statistical information; author's profile; names of co-authors (and links to their author pages); titles of knols authored by and/or contributed to by the author; a control to get an RSS feed of articles written by the author; and citations by the authors (and links thereto). The edit history of the particular author in relation to the knol can be viewed. In an implementation where author ratings are provided, the author's rating can be viewed. In one implementation, an aggregation of authors is referred to as a "group", and any groups to which the author is a member can be identified.

When the author page is viewed by the author in "edit mode", the author can view and edit many of his or her properties. For example, the author can edit the public-profile content. The author can edit account permissions, such as the default visibility and editability of a knol's pages and persons exempt from the defaults. The author can view reviewers (i.e., people who have responded to the knol content) and sort same by quality or recency. The author can invite or request someone to write a knol or to write a review of pages of a knol of the author. Messages can be provided to the author in the edit mode, including the following examples: a message about a suggested edit; notification of a re-use of the author's content (e.g., by transclusion or text re-use); notification of changes in documents owned, watched or contributed to by the author; an assertation of prior use of the author's content; a takedown demand; a takedown notification; a notification of change of a template used by the author; a quota/limit violation; an error message; an offer to transfer ownership; and bulk changes to properties.

Table 2 below shows examples of author page properties, including the property name, type and a description.

TABLE 2

Author Page Properties

| Property | Type | Description |
| --- | --- | --- |
| Name | String | Author's externally visible name or nickname. |
| Disambiguation | String | Zero or more externally visible blobs of "disambiguation" text, for example, to authenticate credentials of the author. |
| Picture | String | URL to image of the author. |
| Profile | String | User supplied text profile. |
| Co-Authors | StringList | List of persons the author shares ownership of pages with. |
| Knols/Author | stringList | Knols authored by the Author. |
| Knols/contributor | StringList | Knols contributed to but not owned by the author. |
| Knols/Edited | StringList | Knols the author has submitted edits to. |
| Knols/Discussed | StringList | Knols the author has replied to in a discussion. |
| Knols/Reviewed | StringList | Knols the author has reviewed. |
| rateLimitCreate | Number | Maximum frequency with which an author can create new knols. |
| rateLimitEdit | Number | Maximum frequency to edit knols. |
| rateLimitMessage | Number | Maximum frequency to send messages to others. |
| rateLimitInvite | Number | Maximum frequency to invite other authors. |
| Notifications | | A collection of messages/alerts sent to the author. |
| Solicitations | | A collection of messages/alerts sent by the author. |

In one implementation, the owner of a knol may choose to display online advertisements when displaying the knol. The owner typically collects revenue from advertisers, either directly or through a broker, for displaying the advertisements. In one example, the owner can participate in the AdSense advertising program provided by Google, Inc., wherein Google provides advertisements to display with the owner's knol. The advertisements can be selected to target an audience expected to be interested in the content of the knol. If the knol has been contributed to by more than one author, then revenue generated from the online advertisements can be shared between the authors. In one implementation, the author's page properties can include a property to allocate the revenue between the owners of knols to which the particular author is entitled to revenue share.

The invention and all of the functional operations described in this specification can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output.

The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; a magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

Figure 5:
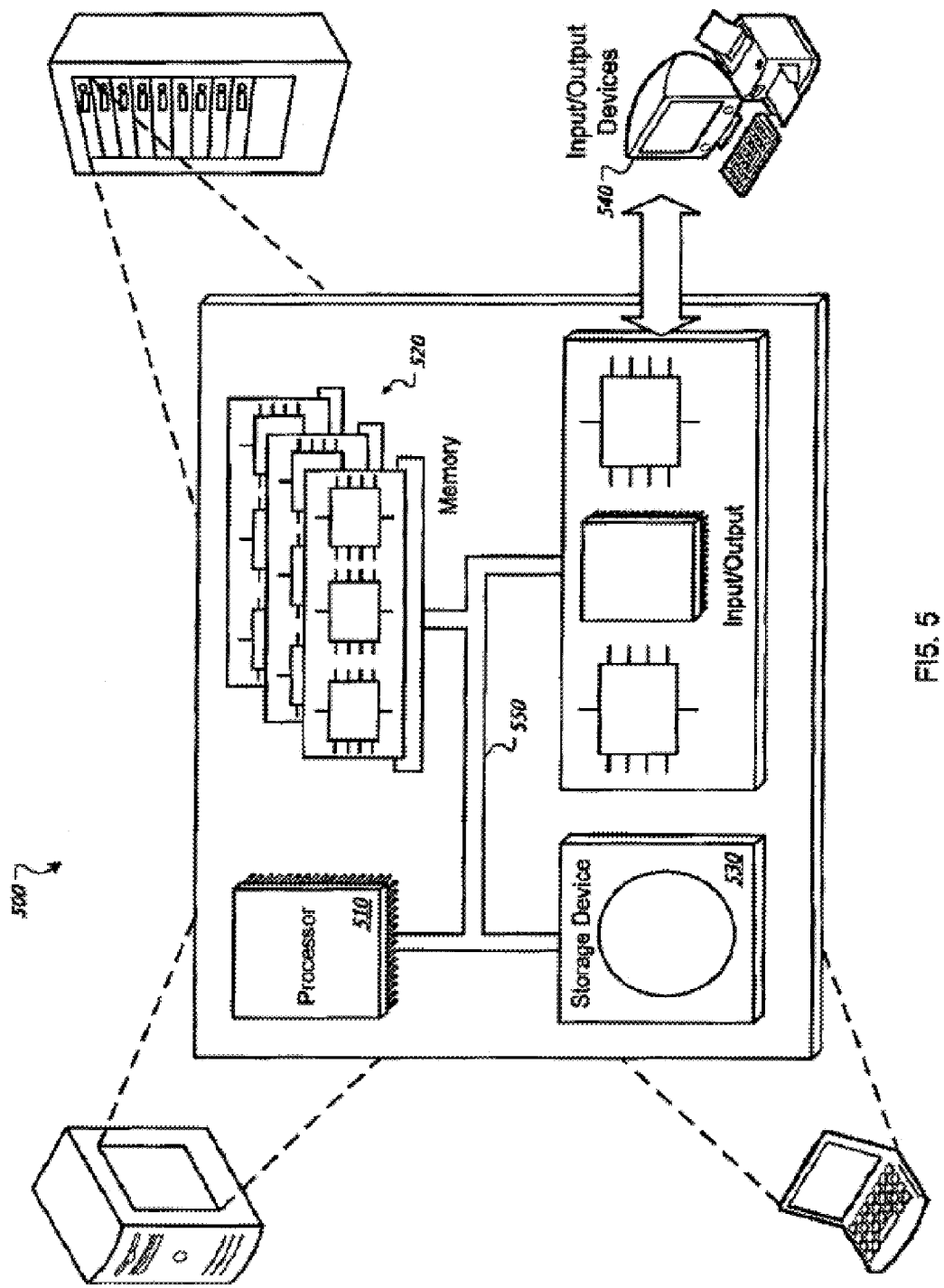
FIG. 5 is a schematic diagram of an example computer system.

Referring now to FIG. 5, a schematic diagram of an example computer system 500 is shown. The system 500 can be used for the operations described in association with the process 300 shown in FIG. 3, according to one implementation. For example, one or more of the systems 500 can be used to implement the search server 101 (see FIGS. 1 and 2).

The system 500 includes a processor 510, a memory 520, a storage device 530, and an input/output device 540. Each of the components 510, 520, 530, and 540 can, for example, be interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540. In some embodiments, a parallel processing set of systems 500 connected over a network may be employed, clustered into one or more server centers.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can, for example, include a hard disk device, an optical disk device, or some other large capacity storage device.

The input/output device 540 provides input/output operations for the system 500. In one implementation, the input/output device 540 includes a keyboard and/or pointing device. In another implementation, the input/output device 540 includes a display unit for displaying graphical user interfaces.

A module, as the term is used throughout this application, can be a piece of hardware that encapsulates a function, can be firmware or can be a software application. A module can perform one or more functions, and one piece of hardware, firmware or software can perform the functions of more than one of the modules described herein. Similarly, more than one piece of hardware, firmware and/or software can be used to perform the function of a single module described herein.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a publisher" includes two or more publishers and reference to "an ad" includes a combination of two or more or different types of ads.

A number of implementations have been described. Nevertheless, it will be understood that various modifications may be made without departing from the spirit and scope of the invention. Accordingly, other implementations are within the scope of this application.

What is claimed is:

1. A method for providing a collaborative editing model for online content, comprising:
　receiving user-created online content comprising a first public-facing version of the content;
　receiving a set of suggested edits to the online content from a plurality of users, where each suggested edit in the set relates to the first public-facing version;
　providing the set of suggested edits to an authorized editor of the online content, wherein the editor is visually notified of differences between the first public-facing version of the content and the suggested edits and is notified of conflicts existing between two or more suggested edits where a conflict exists if a first suggested edit cannot co-exist with a second suggested edit;
　receiving input from the editor resolving conflicts and accepting or rejecting suggested edits in the set;
　modifying the first public-facing version of the content based on the set of suggested edits and the input from the editor to generate a second public-facing version of the content; and
　carrying over suggested edits from the set that were not accepted nor rejected and that are not in conflict with the second public-facing version of the content for future editor input accepting or rejecting the carried over suggested edits in relation to the second public-facing version of the content.

2. The method of claim 1, further comprising:
　receiving additional input from the editor comprising additional edits to the online content;
　wherein the second public-facing version of the content is further based on the additional edits.

3. The method of claim 1, wherein the authorized editor is the author of the user-created online content.

4. The method of claim 1, wherein the authorized editor is a collaborator designated by an author of the user-created online content.

5. The method of claim 1, further comprising:
　receiving a search query for online content satisfying criteria specified by the search query;
　determining the user-created online content satisfies the criteria; and
　providing the user-created online content in response to the search query.

6. The method of claim 1, wherein if input is received from the editor to hold a suggested edit, the suggested edit remains pending with respect to the second public-facing version of the online content.

7. The method of claim 1, further comprising:
　detecting a conflict between a first suggested edit and a second suggested edit;
　notifying the editor of the conflict; and
　receiving additional input from the editor providing a resolution to the conflict.

8. The method of claim 1, wherein providing the suggested edits to the editor includes providing a marked-up version of the online content showing the suggested edits relative to the first public-facing version of the online content.

9. The method of claim 1, further comprising:
　receiving an entry to a discussion thread associated with the online content.

10. A system providing a collaborative editing model for online content comprising:
　a data store configured to store user-created online content;
　a suggested edits module configured to receive a set of suggested edits to the online content where the set of suggested edits is provided by a plurality of users and each suggested edit relates to a first public-facing version of the online content; and
　an editing module configured to:
　　provide the set of suggested edits to an authorized editor of the online content;
　　visually notify the editor differences between the first public-facing version of the content and the set of suggested edits and of conflicts existing between two or more suggested edits;
　　receive input from the editor resolving conflicts and accepting or rejecting suggested edits in the set;
　　modify a first public-facing version of the online content based on the suggested edits and the input from the editor to generate a second public-facing version; and
　　carry over suggested edits from the set that were not accepted nor rejected and are not in conflict with the second public-facing version of the content for future editor input accepting or rejecting the carried over suggested edits in relation to the second public-facing version of the content.

11. The system of claim 10, wherein the editing module is further configured to:
　receive additional input from the editor comprising additional edits to the online content;
　wherein the second public-facing version is further based on the additional edits.

12. The system of claim 10, wherein the editing module is further configured to:
　detect a conflict between a first suggested edit and a second suggested edit;
　notify the editor of the conflict; and
　receive additional input from the editor providing a resolution to the conflict.

13. The system of claim 10, further comprising:
　a search engine configured to:
　　receive a search query for online content satisfying criteria specified by the search query;
　　determine the user-created online content satisfies the criteria; and
　　provide the user-created online content in response to the search query.

14. The system of claim 10, wherein the editing module is further configured to:
　provide a marked-up version of the online content showing the suggested edits relative to the first public-facing version of the online content.

15. The system of claim 10, wherein the suggested edits module is further configured to receive an entry to a discussion thread associated with the online content.

16. A computer-readable medium having instructions stored thereon, which, when executed by a processor, cause the processor to perform operations comprising:
receiving user-created online content comprising a first public-facing version of the content;
receiving a set of suggested edits to the online content from a plurality of users, where each suggested edit in the set relates to the first public-facing version;
providing the set of suggested edits to an authorized editor of the online content, wherein the editor is visually notified of differences between the first public-facing version of the content and the suggested edits and is notified of conflicts existing between two or more suggested edits where a conflict exists if a first suggested edit cannot co-exist with a second suggested edit;
receiving input from the editor resolving conflicts and accepting or rejecting suggested edits in the set;
modifying the first public-facing version of the content based on the set of suggested edits and the input from the editor to generate a second public-facing version of the content; and
carrying over suggested edits from the set that were not accepted nor rejected and are not in conflict with the second public-facing version of the content for future editor input accepting or rejecting the carried over suggested edits in relation to the second public-facing version of the content.

17. The computer-readable medium of claim 16, the operations further comprising;
receiving additional input from the editor comprising additional edits to the online content;
wherein the second public-facing version of the content is further based on the additional edits.

18. The computer-readable medium of claim 16, wherein the authorized editor is the author of the user-created online content.

19. The computer-readable medium of claim 16, wherein the authorized editor is a collaborator designated by an author of the user-created online content.

20. The computer-readable medium of claim 16, the operations further comprising:
receiving a search query for online content satisfying criteria specified by the search query;
determining the user-created online content satisfies the criteria; and
providing the user-created online content in response to the search query.

21. The computer-readable medium of claim 16, wherein if input is received from the editor to hold a suggested edit, the suggested edit remains pending with respect to the second public-facing version of the online content.

22. The computer-readable medium of claim 16, the operations further comprising:
detecting a conflict between a first suggested edit and a second suggested edit;
notifying the editor of the conflict; and
receiving additional input from the editor providing a resolution to the conflict.

23. The computer-readable medium of claim 16, wherein providing the suggested edits to the editor includes providing a marked-up version of the online content showing the suggested edits relative to the first public-facing version of the online content.

24. The computer-readable medium of claim 16, the operations further comprising:
receiving an entry to a discussion thread associated with the online content.

25. A system comprising:
a processor;
a storage device coupled to the processor and configurable for storing instructions, which, when executed by the processor cause the processor to perform operations comprising:
receiving user-created online content comprising a first public-facing version of the content;
receiving a set of suggested edits to the online content from a plurality of users, where each suggested edit in the set relates to the first public-facing version;
providing the set of suggested edits to an authorized editor of the online content, wherein the editor is visually notified of differences between the first public-facing version of the content and the suggested edits and is notified of conflicts existing between two or more suggested edits where a conflict exists if a first suggested edit cannot co-exist with a second suggested edit;
receiving input from the editor resolving conflicts and accepting or rejecting suggested edits in the set;
modifying the first public-facing version of the content based on the set of suggested edits and the input from the editor to generate a second public-facing version of the content; and
carrying over suggested edits from the set that were not accepted nor rejected and are not in conflict with the second public-facing version of the content for future editor input accepting or rejecting the carried over suggested edits in relation to the second public-facing version of the content.

26. The system of claim 25, the operations further comprising;
receiving additional input from the editor comprising additional edits to the online content;
wherein the second public-facing version of the content is further based on the additional edits.

27. The system of claim 25, wherein the authorized editor is the author of the user-created online content.

28. The system of claim 25, wherein the authorized editor is a collaborator designated by an author of the user-created online content.

29. The system of claim 25, the operations further comprising:
receiving a search query for online content satisfying criteria specified by the search query;
determining the user-created online content satisfies the criteria; and
providing the user-created online content in response to the search query.

30. The system of claim 25, wherein if input is received from the editor to hold a suggested edit, the suggested edit remains pending with respect to the second public-facing version of the online content.

31. The system of claim 25, the operations further comprising:
detecting a conflict between a first suggested edit and a second suggested edit;
notifying the editor of the conflict; and
receiving additional input from the editor providing a resolution to the conflict.

32. The system of claim 25, wherein providing the suggested edits to the editor includes providing a marked-up version of the online content showing the suggested edits relative to the first public-facing version of the online content.

33. The system of claim 25, the operations further comprising:
receiving an entry to a discussion thread associated with the online content.

\* \* \* \* \*